United States Patent [19]
Genise et al.

[11] Patent Number: 5,517,411
[45] Date of Patent: May 14, 1996

[54] NEUTRAL ATTAINMENT CONTROL SYSTEM/METHOD FOR CONTROLLING SHIFTING IN VEHICULAR AUTOMATED MECHANICAL TRANSMISSION SYSTEMS

[75] Inventors: Thomas A. Genise, Dearborn; Ronald K. Markyvech, Allen Park, both of Mich.

[73] Assignee: Eaton Corporation, Cleveland, Ohio

[21] Appl. No.: 387,512

[22] Filed: Feb. 13, 1995

[51] Int. Cl.$^6$ .............................. G06G 7/70; B60K 41/26
[52] U.S. Cl. .................. 364/424.1; 364/424.01; 364/431.09; 477/92; 477/94; 123/198 DB; 123/325; 123/492; 123/493; 123/696; 123/694; 192/3.56; 192/3.58
[58] Field of Search ............... 364/424.1, 424.01, 364/431.05, 431.07, 431.09; 74/335, 336 R, 731.1, 337, 339, 375, 475, 665 GE, 721, 745; 477/92, 94, 78, 124, 84, 109, 107, 908, 123, 80; 192/3.56, 3.58, 3.27, 3.26, 3.28, 113.36; 60/39.281, 39.161; 123/696, 694, 373, 179.17, 436, 571, 492, 493, 198 DB, 325

[56] References Cited

U.S. PATENT DOCUMENTS

| | | | |
|---|---|---|---|
| Re. 32,591 | 2/1988 | Richards | 477/78 |
| 3,923,025 | 12/1975 | Isobe et al. | 123/373 |
| 4,181,109 | 1/1980 | Wake et al. | 123/569 |
| 4,361,060 | 11/1982 | Smyth | 477/78 |
| 4,491,108 | 1/1985 | Hasegawa et al. | 123/339.16 |
| 4,539,643 | 9/1985 | Suzuki et al. | 364/424.1 |
| 4,648,290 | 8/1987 | Dunkley et al. | 477/78 |
| 4,698,762 | 10/1987 | Moriya et al. | 364/424.1 |
| 4,850,236 | 7/1989 | Braun | 74/337 |
| 4,858,136 | 8/1989 | Tanaka et al. | 364/431.05 |
| 4,913,269 | 4/1990 | Dunkley et al. | 192/3.63 |
| 5,060,618 | 10/1991 | Takaoka et al. | 123/436 |
| 5,109,729 | 5/1992 | Boardman | 477/107 |
| 5,253,632 | 10/1993 | Brooks | 123/696 |
| 5,413,012 | 5/1995 | Davis | 364/424.1 |
| 5,416,700 | 5/1995 | Bates et al. | 364/424.1 |
| 5,425,284 | 6/1995 | Davis | 74/335 |

*Primary Examiner*—Kevin J. Teska
*Assistant Examiner*—Jacques H. Louis-Jacques
*Attorney, Agent, or Firm*—Howard D. Gordon

[57] ABSTRACT

A robust engine fueling control is provided for assuring neutral attainment in a vehicular automated mechanical transmission system (10) having a manually controlled master clutch (16). Upon sensing a requirement for a shift into transmission neutral, the disengaging jaw clutch members (134A/142A) are constantly urged into a disengaged position, fuel is caused to decrease to idle (302), and then fuel is blipped by increasingly larger amounts (304, 306, 308) until neutral is sensed.

26 Claims, 4 Drawing Sheets

NEUTRAL ATTAINMENT CONTROL SYSTEM/METHOD FOR CONTROLLING SHIFTING IN VEHICULAR AUTOMATED MECHANICAL TRANSMISSION SYSTEMS

BACKGROUND OF THE INVENTION

1. Field of the Invention

The present invention relates to partially automated vehicular mechanical transmission systems of the type not having automatic master clutch controls and utilizing controlled engine fueling to cause substantially zero torque transfer conditions in the driveline for disengaging the jaw clutches associated with a gear ratio to be disengaged. In particular, the present invention relates to a robust, general-purpose engine fueling control to ensure that a transmission system of the type described above will attain neutral under various operating conditions, such as power upshifts, power downshifts, coasting downshifts, coasting downshifts with engine brake actuation, cold weather, hot weather, etc.

2. Description of the Prior Art

Fully and partially automated mechanical transmission systems intended for vehicular use are well known in the prior art, as may be seen by reference to U.S. Pat. Nos. 4,361,060; 4,648,290; 4,595,986; 4,850,236; 5,053,959; 5,109,721; 5,261,288; 5,315,218 and 5,335,566, the disclosures of which are incorporated herein by reference. In these types of systems, engine fueling/braking control is typically utilized to achieve synchronous conditions for engaging a target gear ratio.

The prior art automated transmission systems typically utilized electric, electro-mechanical, electro-hydraulic or electro-pneumatic type actuators to operate a plurality of generally parallel shift rails or a single shift shaft mechanism, or the like, through an X-Y mechanism and/or a plurality of linear actuators. Axially movable jaw clutch members are selectively axially positioned by shift yokes (also called shift forks) carried by shift shafts or block mechanisms, which are axially positioned by shift fingers, pistons and the like. Shift mechanisms of this type may be seen by reference to U.S. Pat. Nos. 4,445,393; 4,873,881; 4,899,607; 4,920,815; Re. 34,260; 4,945,484; 5,000,060; 5,052,535; 4,964,313 and 5,368,145, the disclosures of which are incorporated herein by reference.

It also is known in the prior art to provide automated mechanical transmission systems not having automated master clutch controls or other torque-interrupt devices and, thus, requiring controlled engine fueling to cause zero torque conditions for disengaging the jaw clutch members associated with a ratio to be disengaged. Examples of such automated transmission systems may be seen by reference to U.S. Pat. Nos. 4,722,248; 4,850,236 and 5,261,298, the disclosures of which are incorporated herein by reference.

The prior art controls for disengaging the jaw clutch members of the positive jaw clutch associated with a ratio to be disengaged in a system not having an automated torque-interrupt device, such as an automated master clutch, were not totally satisfactory, as such controls were not sufficiently robust to ensure that the transmission will attain neutral under a wide variety of operating conditions, especially in those systems not equipped with means to sense and/or determine current drivetrain torque values and/or required changes in engine fueling of an undesirably large magnitude.

SUMMARY OF THE INVENTION

In accordance with the present invention, the drawbacks of the prior art are minimized and/or eliminated by the provision of a robust, general-purpose engine fueling control system/method which will assure that a desired transmission neutral condition is attained under a wide variety of vehicle operating conditions while not requiring unduly large fluctuations in engine fueling. To accomplish this, upon initiating disengagement of a selected jaw clutch, the clutch members thereof are constantly biased to disengage while engine fueling is reduced to a minimum level (idle) and then a series of fuel blips of increasing magnitude, with appropriate wait or delay periods therebetween, are performed. Upon sensing neutral attainment, the foregoing procedure is terminated.

Accordingly, it is an object of the present invention to provide an improved, robust, general-purpose engine fueling control which will assure neutral attainment in various vehicle operating conditions and minimize the requirement for unnecessarily large increases (blips) in engine fueling.

This and other objects and advantages of the present invention will become apparent from a reading of the detailed description of the preferred embodiment taken in connection with the attached drawings.

DESCRIPTION OF THE PREFERRED EMBODIMENT

Figure 1:
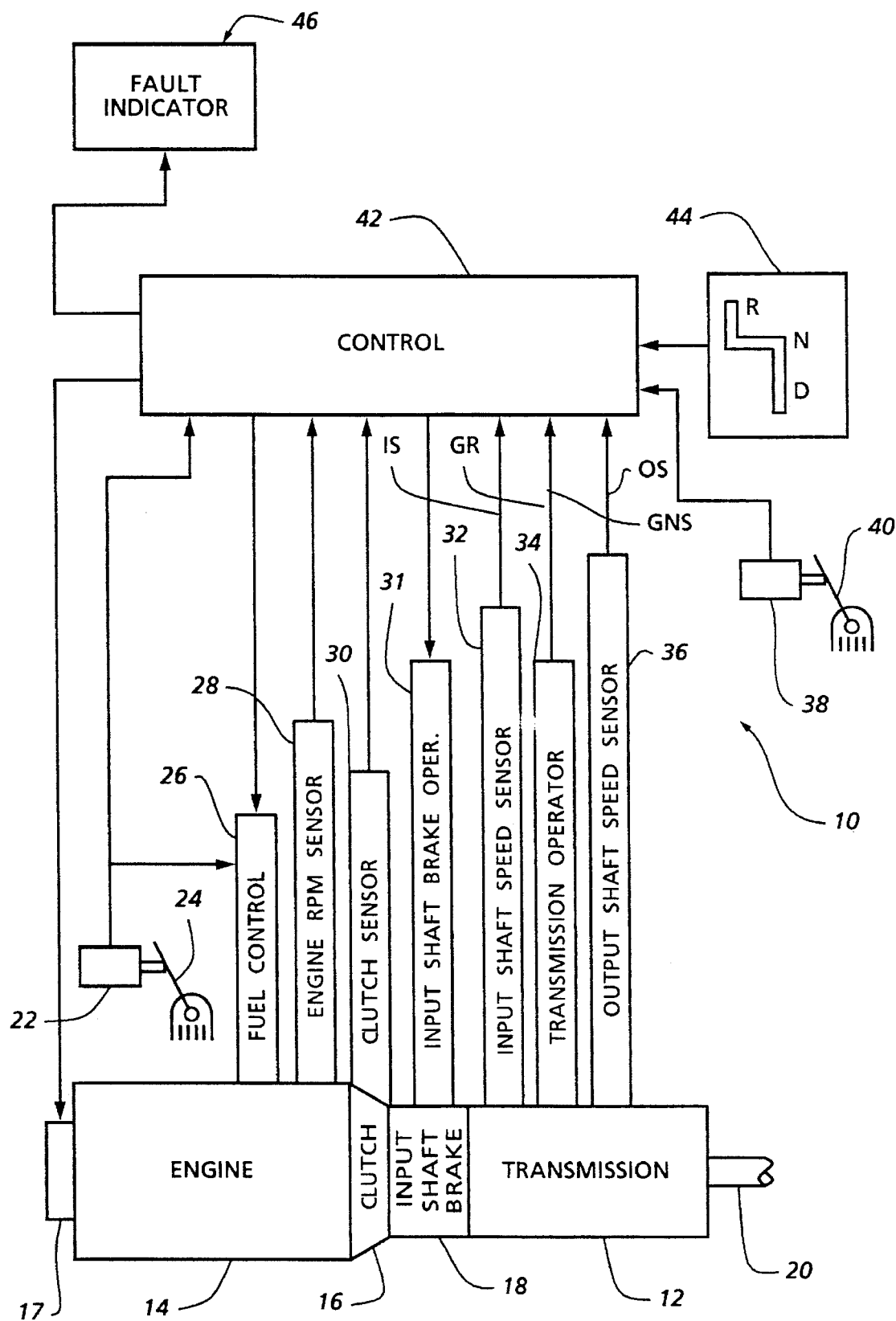
FIG. 1 is a schematic illustration of one example of an automated mechanical transmission system advantageously utilizing the neutral attainment control system/method of the present invention.

FIG. 1 schematically illustrates a vehicular automated mechanical transmission system 10 including an automatic multiple-speed change-gear transmission 12 driven by a throttle-controlled engine 14, such as a well-known diesel engine, through a manually controlled master clutch 16. An engine brake, such as an exhaust brake 17 for retarding the rotational speed of engine 14 and/or an input shaft brake 18 which is effective to apply a retarding force to the input shaft of the transmission upon disengagement of the master clutch 16, may be provided, as is also well known in the prior art. The output of automatic transmission 12 is output shaft 20, which is adapted for driving connection with an appropriate vehicle component, such as the differential of a drive axle, a transfer case or the like.

The aforementioned powertrain components are acted upon and/or monitored by several devices, each of which will be discussed in greater detail below. These devices typically include a throttle position or throttle opening monitor assembly 22, which senses the position of the operator-controlled vehicle throttle and/or other fuel throttling device 24, a fuel-control device 26 for controlling the amount of fuel to be supplied to engine 14, an engine speed sensor 28 which senses the rotational speed of lo the engine, a master clutch sensor 30 which supplies information as to the status of the manually operated master clutch, an input brake operator 31, a transmission input shaft speed sensor 32, a transmission operator 34 which is effective to shift the transmission 12 into a selected gear ratio and to provide a signal or signals indicative of the gear neutral condition and/or currently engaged ratio, and a transmission output shaft speed sensor 36. A vehicle brake monitor 38 senses actuation of the vehicle brake pedal 40.

The aforementioned devices supply information to and/or accept commands from a central processing unit or control 42. The central processing unit 42 may include analog and/or digital electronic calculation and logic circuitry, the specific configuration and structure of which form no part of the present invention and may be of the type illustrated in aforementioned U.S. Pat. No. 4,595,986. The central processing unit 42 also receives information from a shift control assembly 44 by which the vehicle operator may select a reverse (R), neutral (N) or forward drive (D) mode of operation of the vehicle. An electrical power source (not shown) and/or a source of pressurized fluid (not shown) provides electrical, hydraulic and/or pneumatic power to the various sensing, operating and/or processing units. A fault indicator or alarm 46 may display the identity of a specific fault or simply the existence of an unidentified fault.

Sensors 22, 28, 30, 32, 36, 38 and 44 may be of any known type or construction for generating analog or digital signals proportional to the parameter monitored thereby. Similarly, operators 17, 18, 26 and 34 may be of any known electrical, pneumatic, hydraulic or electro-pneumatic or hydraulic type for executing operations in response to command output signals from processing unit 42 and/or for providing input signals thereto. Fuel control 26 normally will supply fuel to engine 14 in accordance with the operator's setting of throttle 24, but may supply a lesser (fuel dip) or greater (fuel boost or blip) amount of fuel in accordance with commands from control unit 42. Fuel control 26 may include an electronically controlled engine, including an engine control microprocessor, and an electronic data link of the type conforming to ISO 11898, SAE J1922 and/or SAE J1939 or similar protocols.

Figure 2:
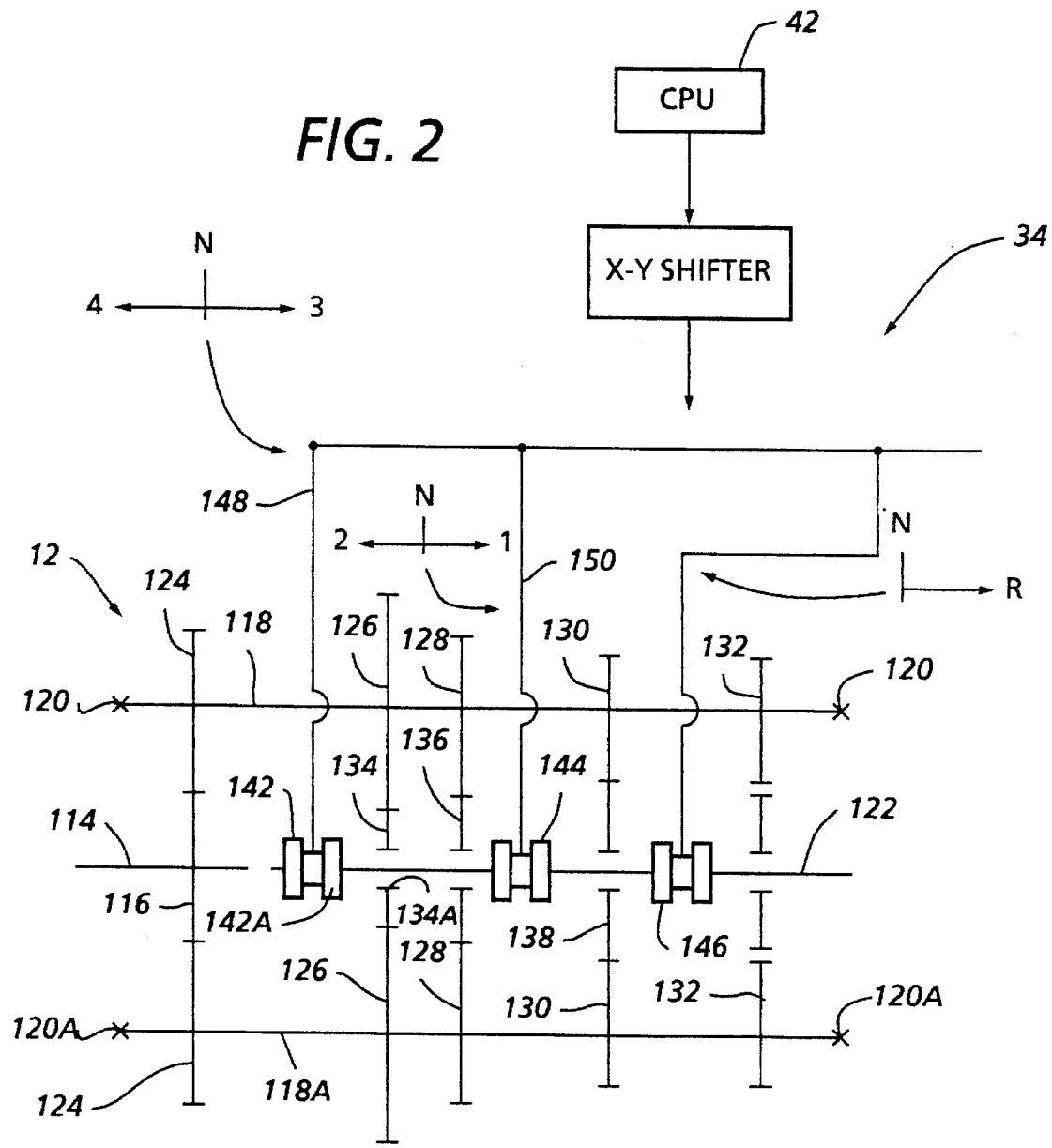
FIG. 2 is a schematic illustration of one example of a simple mechanical change-gear transmission, or a main section of a compound mechanical change-gear transmission, of the type controlled by the present invention.

A typical 4-forward-speed, single-reverse-speed, change-gear mechanical transmission or transmission section 12 for use with system 10 is schematically illustrated in FIG. 2. Transmission 12 is represented, for example only, as a simple transmission, or transmission section, of the twin countershaft type, which is well known in the prior art, and which may be understood in greater detail by reference to U.S. Pat. Nos. 3,105,395; 4,735,109 and 4,152,949, the disclosures of which are incorporated herein by reference.

The illustrated transmission comprises an input shaft 114 carrying an input gear 116 for rotation therewith. Input shaft 114 is intended to be driven by prime mover 14 through a master friction clutch or torque converter, as is well known in the art. A pair of substantially identical countershafts, 118 and 118A, are rotatably mounted in a housing (not shown) by means of bearings, 120 and 120A. A main or output shaft 122 is provided, which is preferably floatingly and/or pivotably mounted in the transmission housing.

Each of the countershafts 120 and 120A carries countershaft gears 124, 126, 128, 130 and 132 fixed thereto for rotation therewith. Countershaft gear 124 is constantly meshed with input gear 116. A third-speed mainshaft gear 134 surrounds mainshaft 122 and is constantly meshed with and supported by the countershaft gears 126. Second-speed mainshaft gear 136 surrounds mainshaft 122 and is constantly meshed with and supported by countershaft gears 128. First-speed mainshaft gear 138 surrounds mainshaft 122 and is constantly meshed with and supported by countershaft gears 130. The reverse mainshaft gear 140 surrounds mainshaft 122 and is constantly meshed with and supported by a pair of idler gears (not shown) which, in turn, are constantly meshed with and driven by countershaft gears 132.

Axially slidable clutches 142, 144 and 146 are mounted, preferably by a spline connection, to mainshaft 122 for sliding movement relative thereto and for rotation therewith. A shift fork or yoke 148 is received in a groove in clutch 142 for controlling the axial position of clutch 142 relative to mainshaft 122. A shift fork 150 is received in a groove in clutch 144 for axially controlling the position of clutch 144 relative to mainshaft 122. A shift fork 152 is received in an axial groove in clutch 146 for controlling the axial position of clutch 146 relative to mainshaft 122.

By way of example, the transmission actuator 34 is shown as an X-Y shift mechanism, as disclosed in aforementioned U.S. Pat. Nos. 4,873,881; 4,899,607 and/or RE 34,260, and a single shaft-type shifting mechanism, as disclosed in aforementioned U.S. Pat. No. 4,920,815. Of course, various other types of shift actuators may be utilized.

Transmission 12 is illustrated, by way of example, as utilizing positive, non-synchronized jaw clutches of the type shown in aforementioned U.S. Pat. Nos. 5,052,535; 4,964,313 and 5,368,145. Of course, synchronized positive clutches also may be utilized. As only one of the clutches should be engaged at any one time to avoid damage to the transmission, shift bar housing assembly 34 will typically include an interlock mechanism (not shown) to prevent movement of more than one of the shift forks 148, 150 and 152 from the neutral axial positions thereof at a given time.

As is well known in automated mechanical transmission systems, to engage a target gear ratio (GRT), the transmission is shifted from the ratio to be disengaged into neutral and, with the master clutch engaged, the engine and, thus, the input shaft are caused to rotate at the synchronous engine speed. The synchronous engine/input shaft speed may be expressed by the expression:

$$ES_{SYNCH} = IS = OS \times GR_T$$

where $ES_{SYNCH}$=synchronous engine speed;

IS=input shaft speed (engine speed with master clutch fully engaged);

OS=output shaft speed; and $GR_T$=numerical value of target gear ratio.

Usually, the shift actuator 34 is commanded to initiate a jaw clutch engagement in advance of engine speed equaling the synchronous speed as a function of the difference between current and synchronous engine speed, the rate of change in engine speed and/or shift actuator response time.

As is well known, especially in mechanical transmissions for heavy-duty vehicles wherein relatively large torques are transferred across the engaged jaw clutches, an engaged jaw clutch under load may become "torque locked" and difficult or impossible to disengage without damage to clutch and/or shifting mechanisms. To relieve a torque-lock condition, it is necessary to reduce the torque across the clutch, usually by causing a driveline torque break, i.e., disengaging the master clutch or manipulating fueling of the engine to cause a torque reversal across the jaw clutch. During a torque reversal, the previously driving one of the engaged jaw clutch members will become the driven jaw clutch member, and vice versa, and during this transition, the jaw clutch will pass through a zero torque transfer condition. See aforementioned U.S. Pat. No. 4,850,236.

As commonly used in the art, a vehicular driveline is said to have "positive" torque when the engine is driving the vehicle and "negative" torque when (as in coasting) the vehicle is driving the engine. As the driveline changes from positive to negative torque, or from negative to positive torque (i.e., during a torque reversal), it will pass through conditions of low and zero torque when jaw clutch engagement and disengagement is most easily accomplished.

While automated mechanical transmission systems are known which will increase and decrease engine fueling to attempt to cause a torque reversal across the disengaging jaw clutches, these systems were not totally satisfactory, as the level of engine fueling corresponding to zero torque at the engine flywheel typically was not known and, thus, to assure a neutral attainment under diverse operating conditions, the required magnitude of fuel increases and decreases was excessive and somewhat objectionable to the vehicle occupants.

Figure 3:
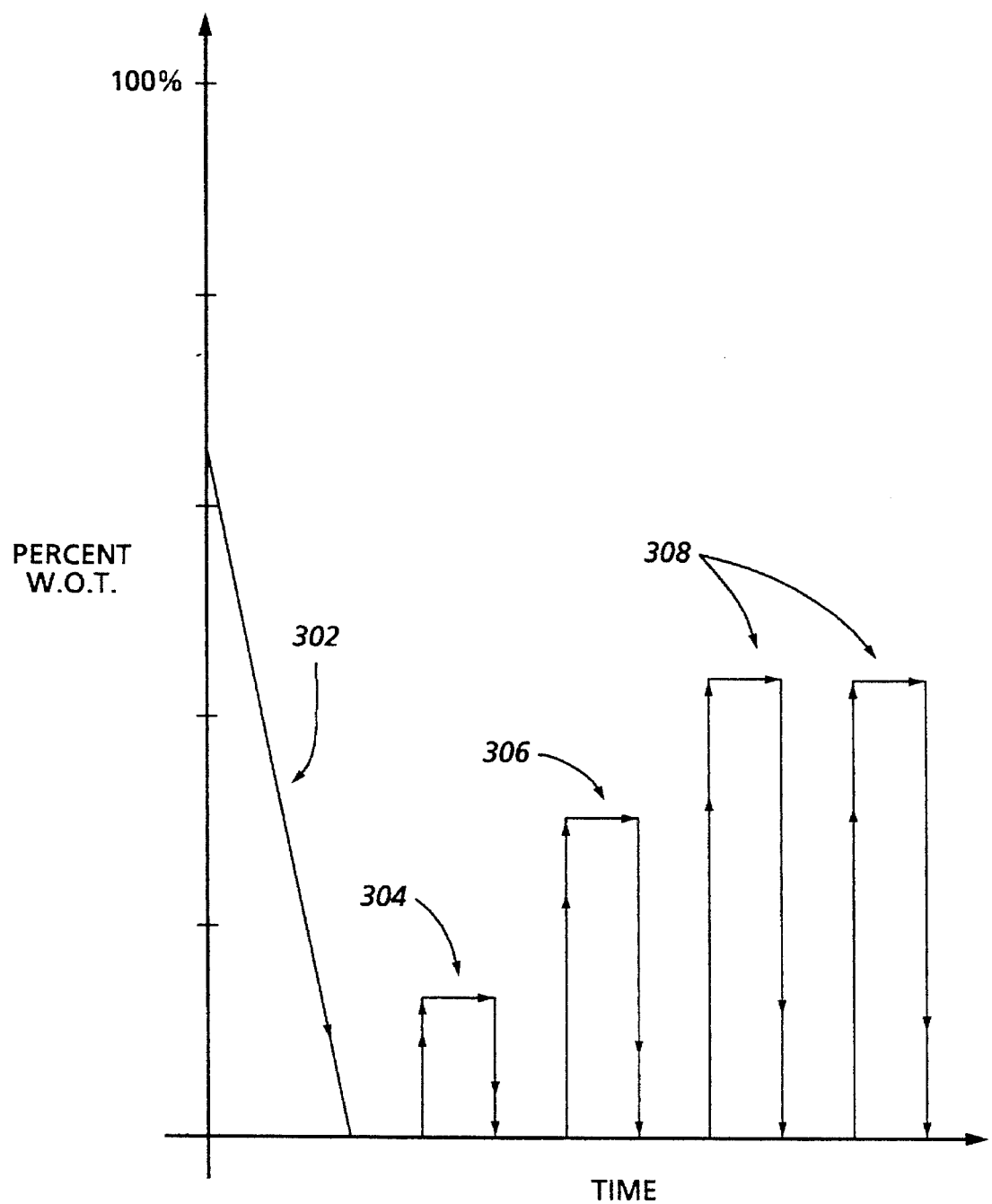
FIG. 3 is graphical representation of the control system/method of the present invention.
Figure 4:
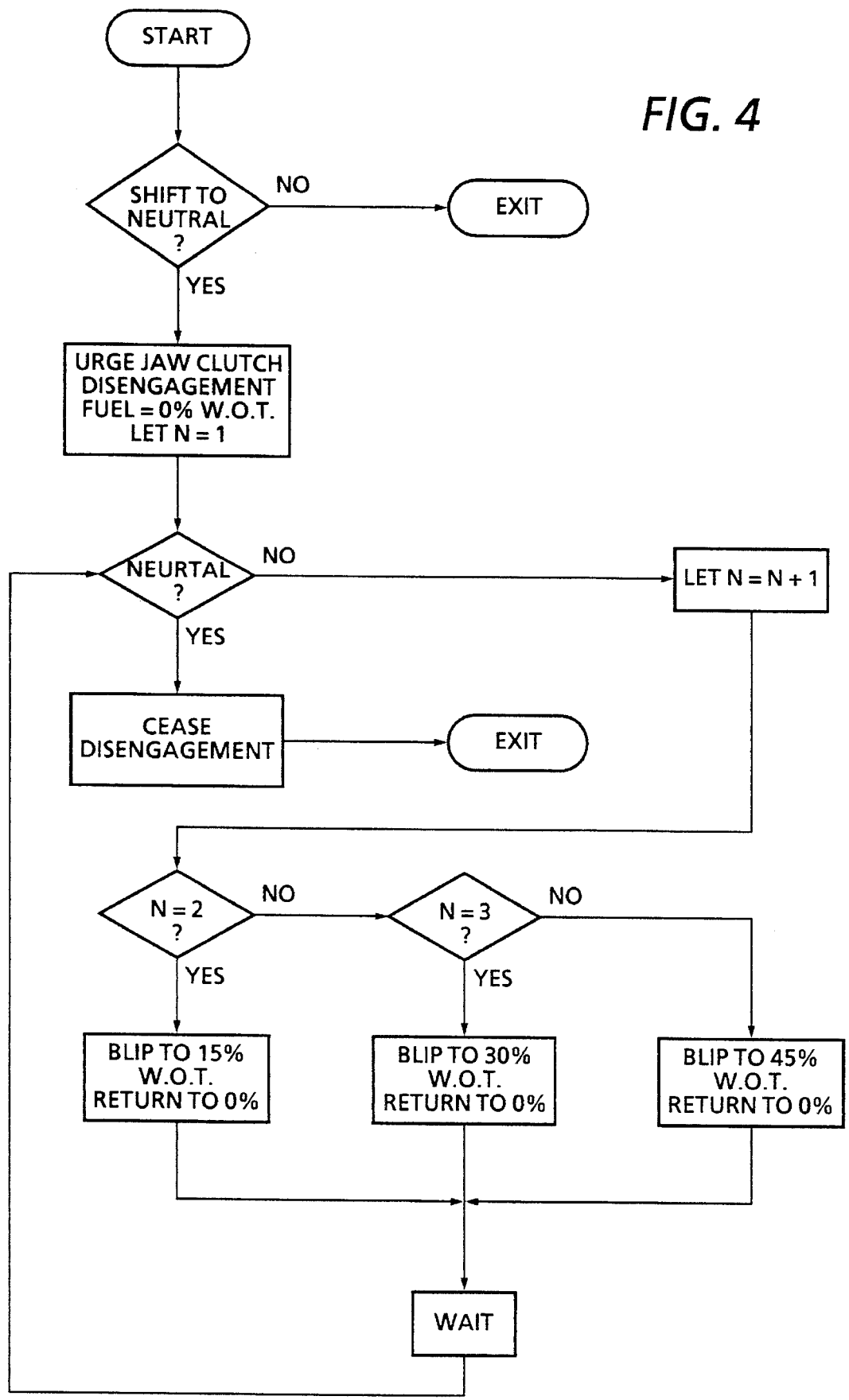
FIG. 4 is a schematic illustration, in flow chart format, of the control system/method of the present invention.

In accordance with the present invention, as schematically illustrated in FIGS. 3 and 4, a robust, general-purpose engine fueling control system/method is provided which will assure that an automated mechanical transmission will attain neutral under a wide range of vehicle operating conditions, such as power upshifts and downshifts, coasting downshifts, coasting downshifts with engine brakes actuated, and operation in both cold and warm weather.

At initiation of a shift from an engaged gear ratio into a target gear ratio, the first operation is to cause disengagement of the jaw clutch members associated with the engaged ratio (i.e., the disengaging jaw clutch). Referring to FIG. 2, assuming third speed is to be disengaged, jaw clutch member 142A (which is rotationally fixed to mainshaft 122 and, thus, has a rotational speed determined by vehicle speed) must be axially disengaged from jaw clutch member 134A (which is fixed to gear 134 and, thus, with the master clutch engaged, has a rotational speed determined by input shaft/ engine speed). To achieve disengagement of the jaw clutch defined by members 142A and 134A (i.e., for neutral attainment), the shift fork 148 will be urged leftwardly by the shift actuator while the fuel control of the present invention is implemented until transmission neutral is sensed.

Referring to FIG. 3, engine fueling is decreased in a steady manner to 0% of wide-open throttle ("WOT"), which equals idle fueling. A typical rate might be 1% of WOT per 0.01 second (see line 302). While this may cause the driveline to pass through a zero torque condition, the transmission operator may not be responsive or powerful enough to achieve a complete clutch disengagement. Then, the controller "blips" the fueling to a relatively low magnitude (for example, about 15% of WOT for about 200 milliseconds) and then allows fueling to return to idle (see blip 304). If, after a wait of about at least 200 milliseconds, neutral attainment is not sensed, the controller causes the fuel to be blipped to a greater magnitude (for example, about 30% of WOT for about 200 milliseconds) and then allows fueling to return to idle (see blip 306). If, after a wait, neutral attainment still is not sensed, the controller then causes a series of fuel blips to a maximum blip magnitude (for example, about 45% of WOT for about 200 milliseconds) and then returns to idle (see blips 308). If the torque at the engine flywheel is positive at the magnitude of fueling for a given blip, each such blip-and-return-to-idle cycle should cause the torque at the disengaging jaw clutch to reverse twice.

FIG. 4 illustrates the engine fueling control of the present invention in flow chart format. Preferably, if a neutral condition is not attained within a given time, or after a given number of blips (i.e., N>REF), then a fault will be sensed and a fault correction routine will be implemented.

It may be seen that the engine fuel control method for assuring neutral attainment provides a series of blips of increasing magnitude whereby neutral attainment will be assured during a wide variety of vehicle operating conditions while minimizing the use of unnecessary, objectionable, excessive large-magnitude blips.

Experience has demonstrated that a single 15%-of-WOT blip is sufficient to attain neutral under most vehicle operating conditions, while the 30%-of-WOT and one or more 45%-of-WOT blips are necessary to attain neutral in certain negative driveline conditions, such as coasting shifts with active full or partial engine compression braking and/or in cold weather conditions and/or certain power upshifts. The required magnitude of blip to attain neutral also may be an inverse function of the force exerted by the shifting mechanism.

Although the present invention has been set forth with a certain degree of particularity, it is understood that various modifications are possible without departing from the spirit and the scope of the invention as hereinafter claimed.

We claim:

1. An information processing machine-implemented process for controlling shifting in a vehicular automated mechanical transmission system comprising a fuel-controlled engine (14) having a minimum (0% WOT) and a maximum (100% WOT) magnitude of fueling, a fuel controller (26) for controlling fueling of the engine, a multiple-speed, change-gear transmission (12) having a plurality of selectively engaged forward gear ratios, gear ratio shifts of said transmission comprising a sequence of disengaging a first positive clutch (142A/134A) and then engaging a second positive clutch, both of said positive clutches comprising a first clutch member (134A) having a rotational speed determined by the rotational speed of the engine (ES, IS) and a second clutch member (142A) having a rotational speed determined by vehicle ground speed (OS), a transmission operator (34) for selectively positioning said clutch members to engaged and disengaged positions, a non-positive coupling (16) drivingly interposed between said engine and said transmission, and an information processing machine (42) for receiving a plurality of input signals including an input signal indicative of engine speed and an input signal indicative of engaged and disengaged positions of said clutch members and for processing same according to predetermined logic rules to issue command output signals to a plurality of system actuators including said fuel controller and said transmission operator, said process, upon determining a requirement for disengaging said first positive clutch, comprising:

(1) sensing for disengagement of said first positive clutch; and (2) until disengagement of said first positive clutch is sensed, (a) continuously causing said transmission operator to urge said first and second clutch members of said first positive clutch into the disengaged position thereof; and (b) causing said fuel controller, in sequence, to:

(i) cause engine fueling to equal said minimum value thereof (302);

(ii) cause fueling of said engine to be increased to a first predetermined value and then to be decreased to said minimum value thereof (304); and (iii) after a first predetermined period of time, cause fueling of said engine to be increased to a second predetermined value and then decreased to said minimum value thereof (306), said second predetermined value being greater than said first predetermined value.

2. The process of claim 1 further comprising, after step (2)(b)(iii), (iv) after a second predetermined period of time, cause said engine fueling to be increased to a third predetermined value and then decreased to said minimum value thereof (308), said third predetermined value being greater than said second predetermined value.

3. The process of claim 1 wherein said non-positive coupling is a master friction clutch not responsive to said command output signals from said controller.

4. The process of claim 2 wherein said non-positive coupling is a master friction clutch not responsive to said command output signals from said controller.

5. The process of claim 1 wherein said second predetermined value is no less than twice as great a percentage of said maximum value than said first predetermined value.

6. The process of claim 1 wherein said first predetermined value is about 15% of said maximum value and said second predetermined value is about 30% of said maximum value.

7. The process of claim 2 wherein said second predetermined value is no less than twice as great a percentage of said maximum value than said first predetermined value.

8. The process of claim 2 wherein said first predetermined value is about 10–20% of said maximum value, said second predetermined value is about 25–35% of said maximum value, and said third predetermined value is about 40–50% of said maximum value.

9. The process of claim 1 further comprising, upon sensing disengagement of said first positive clutch, ceasing to urge said first and second clutch members of said first positive clutch into the disengaged positions thereof and not performing uncompleted ones of steps (4) and (5).

10. The process of claim 2 further comprising, upon sensing disengagement of said first positive clutch, ceasing to urge said first and second clutch members of said first clutch into the disengaged positions thereof and not performing the uncompleted ones of steps (4), (5) and (6).

11. A system for controlling shifting in a vehicular automated mechanical transmission system comprising a fuel-controlled engine (14) having a minimum (0% WOT) and a maximum (100% WOT) magnitude of fueling, a fuel controller (26) for controlling fueling of the engine, a multiple-speed, change-gear transmission (12) having a plurality of selectively engaged forward gear ratios, gear ratio shifts of said transmission comprising a sequence of disengaging a first positive clutch (142A/134A) and then engaging a second positive clutch, both of said positive clutches comprising a first clutch member (134A) having a rotational speed determined by the rotational speed of the engine (ES, IS) and a second clutch member (142A) having a rotational speed determined by vehicle ground speed (OS), a transmission operator (34) for selectively positioning said clutch members to engaged and disengaged positions, a non-positive coupling (16) drivingly interposed between said engine and said transmission, and an information processing machine (42) for receiving a plurality of input signals including an input signal indicative of engine speed and an input signal indicative of engaged and disengaged positions of said clutch members and for processing same according to predetermined logic rules to issue command output signals to a plurality of system actuators including said fuel controller and said transmission operator, said processing machine having a memory containing logic rules effective, upon determining a requirement for disengaging said first positive clutch:

(1) for sensing for disengagement of said first positive clutch; and (2) until disengagement of said first positive clutch is sensed, for (a) continuously causing said transmission operator to urge said first and second clutch members of said first positive clutch into the disengaged position thereof; and (b) causing said fuel controller, in sequence, to:

(i) cause engine fueling to equal said minimum value thereof (302);

(ii) cause fueling of said engine to be increased to a first predetermined value and then to be decreased to said minimum value thereof (304); and (iii) after a first predetermined period of time, cause fueling of said engine to be increased to a second predetermined value and then decreased to said minimum value thereof (306), said second predetermined value being greater than said first predetermined value.

12. The system of claim 11 wherein said means are further effective, after step (2)(b)(iii), (iv) after a second predetermined period of time, cause said engine fueling to be increased to a third predetermined value and then decreased to said minimum value thereof (308), said third predetermined value being greater than said second predetermined value.

13. The system of claim 11 wherein said non-positive coupling is a master friction clutch not responsive to said command output signals from said controller.

14. The system of claim 12 wherein said non-positive coupling is a master friction clutch not responsive to said command output signals from said controller.

15. The system of claim 11 wherein said second predetermined value is no less than twice as great a percentage of said maximum value than said first predetermined value.

16. The system of claim 11 wherein said first predetermined value is about 15% of said maximum value and said second predetermined value is about 30% of said maximum value.

17. The system of claim 12 wherein said second predetermined value is no less than twice as great a percentage of said maximum value than said first predetermined value.

18. The system of claim 12 wherein said first predetermined value is about 10–20% of said maximum value, said second predetermined value is about 25–35% of said maximum value, and said third predetermined value is about 40–50% of said maximum value.

19. The system of claim 11 wherein said means are further effective, upon sensing disengagement of said first positive clutch, for ceasing to urge said first and second members of said first positive clutch into the disengaged positions thereof and not performing uncompleted ones of steps (2)(a) and (b).

20. The system of claim 12 wherein said means are further effective, upon sensing disengagement of said first positive clutch, for ceasing to urge said first and second clutch members of said first clutch into the disengaged positions thereof and not performing the uncompleted ones of steps (2)(a) and (b).

21. An information processing machine (42) for controlling shifting in a vehicular automated mechanical transmission system comprising a fuel-controlled engine (14) having a minimum (0% WOT) and a maximum (100% WOT) magnitude of fueling, a fuel controller (26) for controlling fueling of the engine, a multiple-speed, changegear transmission (12) having a plurality of selectively engaged forward gear ratios, gear ratio shifts of said transmission comprising a sequence of disengaging a first positive clutch (142A/134A) and then engaging a second positive clutch, both of said positive clutches comprising a first clutch member (134A) having a rotational speed determined by the rotational speed of the engine (ES, IS) and a second clutch member (142A) having a rotational speed determined by vehicle ground speed (OS), a transmission operator (34) for selectively positioning said clutch members to engaged and disengaged positions, a non-positive coupling (16) drivingly interposed between said engine and said transmission, and a control unit (42) for receiving a plurality of input signals including an input signal indicative of engine speed and an input signal indicative of engaged and disengaged positions of said clutch members and for processing same according to predetermined logic rules to issue command output signals to a plurality of system actuators including said fuel controller and said transmission operator, said machine including a memory storing logic rules effective, upon determining a requirement for disengaging said first positive clutch:

(1) for causing sensing for disengagement of said first positive clutch; and (2) until disengagement of said first positive clutch is sensed,
   (a) for continuously causing said transmission operator to urge said first and second clutch members of said first positive clutch into the disengaged position thereof; and
   (b) for causing said fuel controller, in sequence, to:
      (i) cause engine fueling to equal said minimum value thereof (302);
      (ii) cause fueling of said engine to be increased to a first predetermined value and then to be decreased to said minimum value thereof (304); and
      (iii) after a first predetermined period of time, cause fueling of said engine to be increased to a second predetermined value and then decreased to said minimum value thereof (306), said second predetermined value being greater than said first predetermined value.

22. The machine of claim 21 wherein said logic rules are effective for causing said fuel controller to, after step (2)(b)(iii),
   (iv) after a second predetermined period of time, cause said engine fueling to be increased to a third predetermined value and then decreased to said minimum value thereof (308), said third predetermined value being greater than said second predetermined value.

23. The machine of claim 21 wherein said first predetermined value is about 15% of said maximum value and said second predetermined value is about 30% of said maximum value.

24. The machine of claim 22 wherein said first predetermined value is about 10–20% of said maximum value, said second predetermined value is about 25–35% of said maximum value, and said third predetermined value is about 40–50% of said maximum value.

25. The machine of claim 21 wherein said logic rules are further effective, upon sensing disengagement of said first positive clutch, for ceasing to urge said first and second members of said first positive clutch into the disengaged positions thereof and not causing the uncompleted ones of steps (4) and (5) to be performed.

26. The machine of claim 22 wherein said logic rules are further effective, upon sensing disengagement of said first positive clutch, for ceasing to urge said first and second clutch members of said first clutch into the disengaged positions thereof and not causing the uncompleted ones of steps (4), (5) and (6) to be performed.

* * * * *